United States Patent
Delmotte et al.

(10) Patent No.: US 10,822,978 B2
(45) Date of Patent: Nov. 3, 2020

(54) REVOLVING PART FOR A TURBINE TEST BENCH FOR A TURBOMACHINE, TURBINE TEST BENCH COMPRISING SAID PART, AND METHOD FOR THE USE OF THESE

(71) Applicant: SAFRAN AIRCRAFT ENGINES, Paris (FR)

(72) Inventors: Aurèlien Gaëtan Delmotte, Vulaines sur Seine (FR); Joël Maurice Creti, Ussy sur Marne (FR); Laurent Jacques Roger Jean Doublet, Yerres (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 160 days.

(21) Appl. No.: 16/072,929

(22) PCT Filed: Jan. 24, 2017

(86) PCT No.: PCT/FR2017/050149
§ 371 (c)(1),
(2) Date: Jul. 26, 2018

(87) PCT Pub. No.: WO2017/129892
PCT Pub. Date: Aug. 3, 2017

(65) Prior Publication Data
US 2019/0032502 A1 Jan. 31, 2019

(30) Foreign Application Priority Data

Jan. 27, 2016 (FR) ...................................... 16 50658

(51) Int. Cl.
*F01D 11/00* (2006.01)
*F04D 29/26* (2006.01)
(Continued)

(52) U.S. Cl.
CPC ............ *F01D 11/001* (2013.01); *F01D 5/025* (2013.01); *F01D 21/003* (2013.01);
(Continued)

(58) Field of Classification Search
CPC ...... F01D 11/001; F01D 21/003; F01D 5/025; G01M 15/14; F04D 29/26; F05D 2260/83; F05D 2260/37
(Continued)

(56) References Cited

U.S. PATENT DOCUMENTS 2,441,432 A * 5/1948 McGee ................... F01D 5/025
416/188
3,884,595 A 5/1975 Herrick
(Continued)

FOREIGN PATENT DOCUMENTS

EP 1270950 A2 1/2003

OTHER PUBLICATIONS

International Search Report for International Application No. PCT/FR2017/050149 dated Apr. 24, 2017.
(Continued)

*Primary Examiner* — J. Todd Newton
(74) *Attorney, Agent, or Firm* — Pearne & Gordon LLP (57) ABSTRACT

The invention relates to a part of revolution (60) intended to be rotated, comprising a hub (62) intended to be tightly adjusted on a rotary shaft (24), and a body (14) extending radially outwards from an axial end of the hub. In order to increase the critical speed up to which the tightening can be retained, the hub (62) comprises three relatively thick annular regions (68, 66, 70) separated from one another by two relatively thin annular regions (64a, 64b), in such a way that when the part of revolution is subject to a centrifugal force (F), the two relatively thin annular regions (64a, 64b) form privileged deformation zones acting as a double pivot. Such
(Continued)

a part can advantageously be used as a piston for balancing in a turbine test bench or in a turbomachine.

8 Claims, 6 Drawing Sheets

(51) Int. Cl.
  *G01M 15/14* (2006.01)
  *F01D 5/02* (2006.01)
  *F01D 21/00* (2006.01)
(52) U.S. Cl.
  CPC ........... *F04D 29/266* (2013.01); *G01M 15/14* (2013.01); *F05D 2260/37* (2013.01); *F05D 2260/83* (2013.01)
(58) Field of Classification Search
  USPC ..... 416/198 R, 186 A, 198 A, 186 R, 244 R; 415/199.1
  See application file for complete search history.

(56) References Cited

U.S. PATENT DOCUMENTS

| 2012/0189373 A1* | 7/2012 | Lange | F01D 5/025 403/1 |
| 2013/0251531 A1* | 9/2013 | Yagi | F04D 29/20 416/192 |
| 2014/0356179 A1* | 12/2014 | Yagi | F04D 17/12 416/223 R |
| 2019/0032502 A1* | 1/2019 | Delmotte | G01M 15/14 |

OTHER PUBLICATIONS

Written Opinion for International Application No. PCT/FR2017/050149 dated Apr. 24, 2017.
French Search Report issued in Patent Application No. FR 16 50658 dated Oct. 14, 2016.

* cited by examiner

REVOLVING PART FOR A TURBINE TEST BENCH FOR A TURBOMACHINE, TURBINE TEST BENCH COMPRISING SAID PART, AND METHOD FOR THE USE OF THESE

This is a National Stage application of PCT international application PCT/FR2017/050149, filed on Jan. 24, 2017 entitled "REVOLVING PART FOR A TURBINE TEST BENCH OR FOR A TURBOMACHINE, TURBINE TEST BENCH COMPRISING SAID PART, AND METHOD FOR THE USE OF THESE", which claims the priority of French Patent Application No. 16 50658 filed Jan. 27, 2016, both of which are incorporated herein by reference in their entirety.

TECHNICAL FIELD

The present invention relates to a part of revolution for a turbine test bench or for a turbomachine for being rotated, in particular at angular velocities likely to induce a significant deformation of the part, and comprising a hub for being snugly fitted to a rotatable shaft, and a body extending radially outwardly from the hub.

The invention also relates to a turbine test bench, comprising such a part of revolution forming a balance piston, that is a part for being subjected to the pressure of a pressurised fluid to apply an axial load to a turbine to be tested.

Finally, it relates to a method for testing a turbine, such as a turbine for an aircraft turbomachine, by means of such a test bench.

STATE OF PRIOR ART

Generally, a part of revolution of the type described above, which undergoes a quick rotational movement, tends to be deformed such that the body of the part deviates radially outwardly relative to the axis of the part and drives part of the hub therewith, thereby causing an undesirable loosening of the part relative to the rotating shaft.

This problem relates for example to the balance pistons used in turbine test benches, or in other types of rotating machines, for example in turbomachines.

Figures 1, 2:
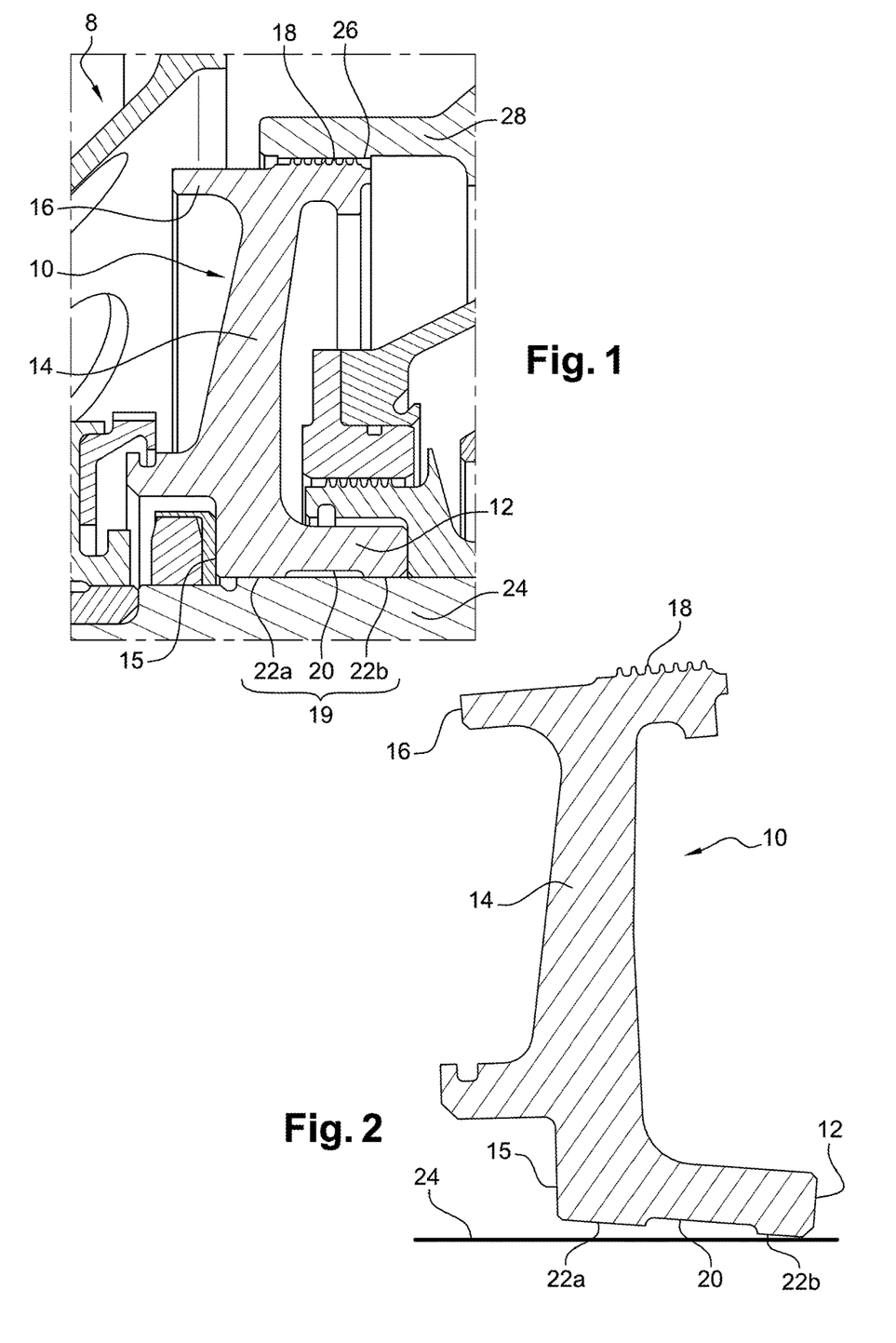
FIG. 1, already described, is a partial schematic half-view in axial section and perspective of a turbine test bench comprising a balance piston consisting of a part of revolution of a known type comprising a hub snugly fitted to a rotor shaft.
FIG. 2, already described, is a schematic half-view in axial section of the part of revolution of the bench of FIG. 1, deformed by centrifugal effect.
Figure 3:
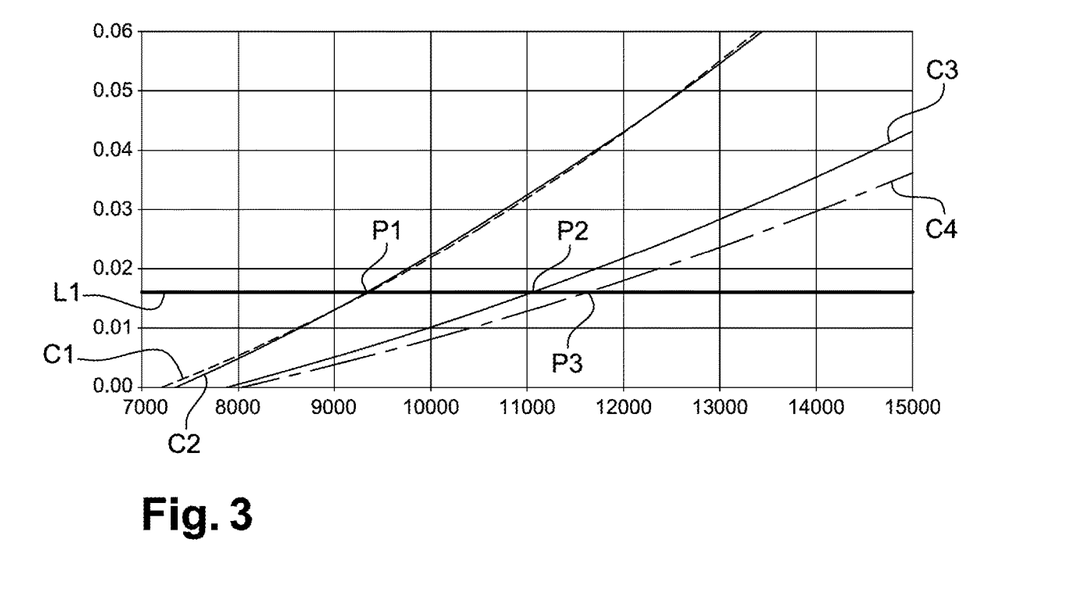
FIG. 3, already described, is a graph illustrating a change over time of the clearance between the hub of the part of revolution and the rotor shaft of the bench of FIG. 1, as a function of the rotation speed of the rotor shaft.

This issue is illustrated by FIGS. 1 to 3.

FIG. 1 illustrates such a balance piston within a turbine test bench 8. This balance piston takes the form of a part of revolution 10 comprising a hub 12, a body 14 extending radially outwardly from the hub 12, for example from an axial end 15 of the hub, and a head 16 formed at the radially outer end of the body 14 and having sealing lips 18, sometimes called "knife edge seals".

The hub has a radially inner face 19 including an annular groove 20 and two cylindrical bearing seats 22a, 22b separated from each other by the annular groove 20 and snugly fitted to a rotor shaft 24 of the bench, typically by shrinking. This rotor shaft 24 is for being connected to a rotor shaft of a turbine. The cylindrical bearing seats comprise a first cylindrical bearing seat 22a located on the same axial side as the body 14 relative to the annular groove 20, and a second cylindrical bearing seat 22b located on the opposite axial side.

The sealing lips 18 of the head 16 cooperate with a cylindrical track 26 carried by a stator element 28 of the bench, so as to form a labyrinth seal. Such a seal is intended, in use, to confine a pressurised gas on a side of the balance piston 10, such that the same can convert the gas pressure into an axial load against the turbine. Other types of rotating seals can be alternatively used, such as brush strip seals or abradable coating seals.

FIG. 2 illustrates the part of revolution 10 in use. Because of its high speed rotation, the part is deformed by centrifugal effect. More precisely, the body 14 of the part deviates radially outwardly and drives the first cylindrical bearing seat 22a therewith, and cumulatively, the entire hub and thus in particular the second cylindrical bearing seat 22b, thus inducing a clearance between each of both cylindrical bearing seats 22a, 22b and the rotor shaft 24. The deformation of the part of revolution 10 further induces tilt of the head 16, possibly compromising sealing of the rotating seal.

Figure 2A:
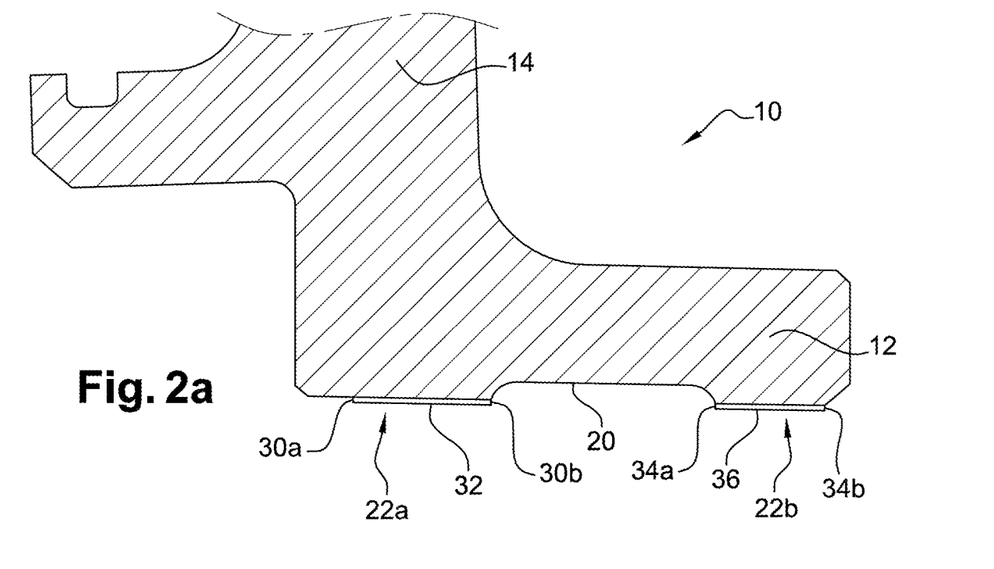
FIG. 2a, already described, is a greater scale view of a part of FIG. 2, illustrating the hub of the part of revolution.

As a result, there is a risk that the part of revolution 10 becomes unfastened from the rotor shaft 24, illustrated by FIG. 3 which is a graph having in abscissa the rotation speed of the rotor shaft 24 in revolutions per minute, and as ordinate the clearance relative to the rotor shaft 24 in millimetres. This graph includes:

- a first curve C1 relating to a first axial end 30a (FIG. 2a) of the contact zone 32 between the first cylindrical bearing seat 22a and the rotor shaft 24, the first axial end 30a being located on the opposite side of the second cylindrical bearing seat 22b,
- a second curve C2 relating to a second axial end 30b (FIG. 2a) of the contact zone 32 between the first cylindrical bearing seat 22a and the rotor shaft 24, the second axial end 30b being located on the side of the second cylindrical bearing seat 22b,
- a third curve C3 relating to a first axial end 34a (FIG. 2a) of the contact zone 36 between the second cylindrical bearing seat 22b and the rotor shaft 24, the first axial end 34a being located on the side of the first cylindrical bearing seat 22a,
- a fourth curve C4 relating to a second axial end 34b (FIG. 2a) of the contact zone 36 between the second cylindrical bearing seat 22b and the rotor shaft 24, the second axial end 34b being located on the opposite side of the first cylindrical bearing seat 22a.

In this graph, the horizontal line L1 having in ordinate 0.016 mm symbolises the maximum clearance beyond which clamping (or shrinking) is considered as lost for the zone concerned.

Thus, point P1, common to curves C1 and C2, corresponds to the clamping loss of the first cylindrical bearing seat 22a when the rotation speed reaches 9200 revolutions per minute. Point P2 corresponds to the beginning of a partial clamping loss of the second cylindrical bearing seat 22b, when the rotation speed reaches 11,100 revolutions per minute, whereas point P3 corresponds to the total clamping loss of the second cylindrical bearing seat 22b, when the rotation speed reaches a critical speed of 11,600 revolutions per minute.

Such a critical speed turns out to be insufficient for testing turbines of some aircraft engines, in particular in the case of turboprop engines with a relatively reduced size, the rated operating speed of which can exceed 18,000 revolutions per minute, whereas the maximum overspeed, to which it is also necessary to test the turbine, exceeds 30,000 revolutions per minute.

But, a clamping loss of the balance piston in use risks bringing about an unbalance or detrimental vibration, possibly compromising the possibilities to reach the desired speed.

Thus, there is a need for a part of revolution capable of preserving its clamping to a rotatable shaft at higher speeds than in the case of part of revolutions of prior art.

DISCLOSURE OF THE INVENTION

One purpose of the invention is in particular to provide a simple, economic and efficient solution to this problem.

To that end, it provides a part of revolution, in particular for a turbine test bench or a turbomachine, for being rotated, and comprising a hub for being snugly fitted to a rotatable shaft, and a body extending radially outwardly from an axial end of the hub.

According to the invention, the hub includes five annular regions axially succeeding one another from the axial end of the hub, that is, in order, a first annular region extending from the body, a second annular region, a third annular region, a fourth annular region, and a fifth annular region, the second annular region and the fourth annular region having a thickness lower than a thickness of the third and fifth annular regions, such that when the part of revolution is subjected to a centrifugal force, the second and fourth annular regions form favoured deformation zones behaving as a double pivot.

The shape of the hub thus enables a decoupling of the respective deformations of the fifth annular region and the body of the part, which are induced by the centrifugal force, to be favoured, which enables in particular clamping of the fifth annular region to be preserved at speeds which are dramatically higher than the critical speeds of the part of revolutions of prior art.

In one preferred embodiment of the invention, the part of revolution further comprises a head formed at a radially outer end of the body of the part of revolution and having first sealing means being part of a rotatable seal.

The part of revolution can thus make up a balance piston or any other type of part being part of a rotatable seal.

In the preferred embodiment of the invention, the hub has a radially inner face including an annular groove, and two cylindrical bearing seats separated from each other by the annular groove and extending facing the first and fifth annular regions respectively.

In addition, the annular groove preferably extends facing the second, third and fourth annular regions.

The hub advantageously has a radially outer face including two annular throats which delimit the second and fourth annular regions respectively.

The invention also relates to a turbine test bench, comprising a rotor shaft for supporting the rotor of a turbine to be tested, as well as a part of revolution of the type described above, snugly fitted to said rotor shaft and for being subjected to the pressure of a pressurised fluid to apply an axial load to the turbine to be tested.

In this particular application, the part of revolution thus makes up a balance piston.

Preferably, the part of revolution further comprises a head formed at a radially outer end of the body of the part of revolution and having first sealing means, and the bench further comprises an annular element relative to which the part of revolution is rotatably movable, said annular element having second sealing means cooperating with said first sealing means to form a rotatable seal.

Finally, the invention relates to a method for testing a turbine, such as a turbine for an aircraft turbomachine, comprising at least steps of mounting the turbine into a test bench of the type described above, in particular connecting a rotor of the turbine to the rotor shaft of the test bench, and then rotating the turbine rotor, and thereby causing rotating of the part of revolution, while applying a pressurised gas to a side of the body of the part of revolution facing the turbine such that the part of revolution applies an axial load to the turbine. According to this method, the body of the part of revolution deviates radially outwardly under the effect of a centrifugal force induced by the rotation of the part of revolution, while the second and fourth annular regions of the hub of the part of revolution are deformed as a double pivot.

BRIEF DESCRIPTION OF THE DRAWINGS

The invention will be better understood, and further details, advantages and characteristics thereof will appear upon reading the following description made by way of non-limiting example and in reference to the appended drawings in which.

Throughout these figures, identical references can designate identical or analogous elements.

DETAILED DISCLOSURE OF PREFERRED EMBODIMENTS

Figure 4:
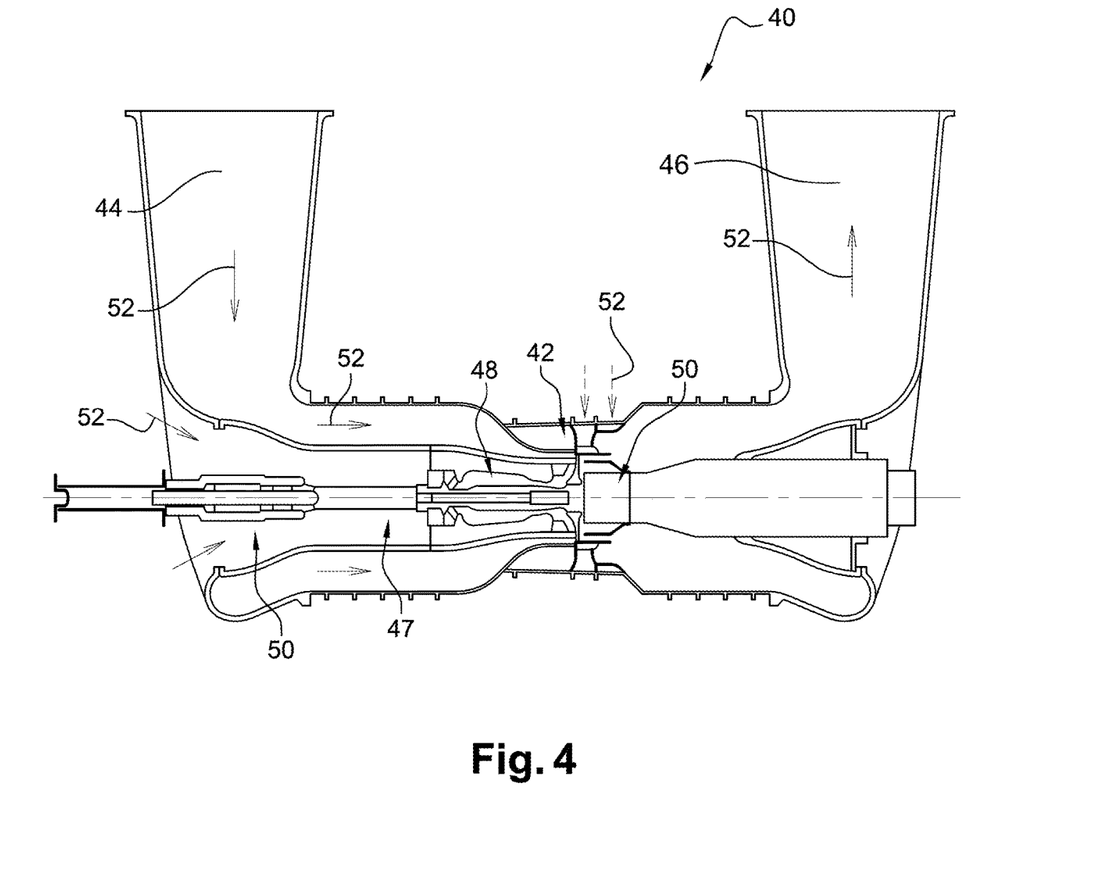
FIG. 4 is a partial schematic half-view in axial section and perspective of a test bench comprising a balance piston consisting of a part of revolution according to a preferred embodiment of the invention, comprising a hub snugly fitted to a rotor shaft.
Figure 5:
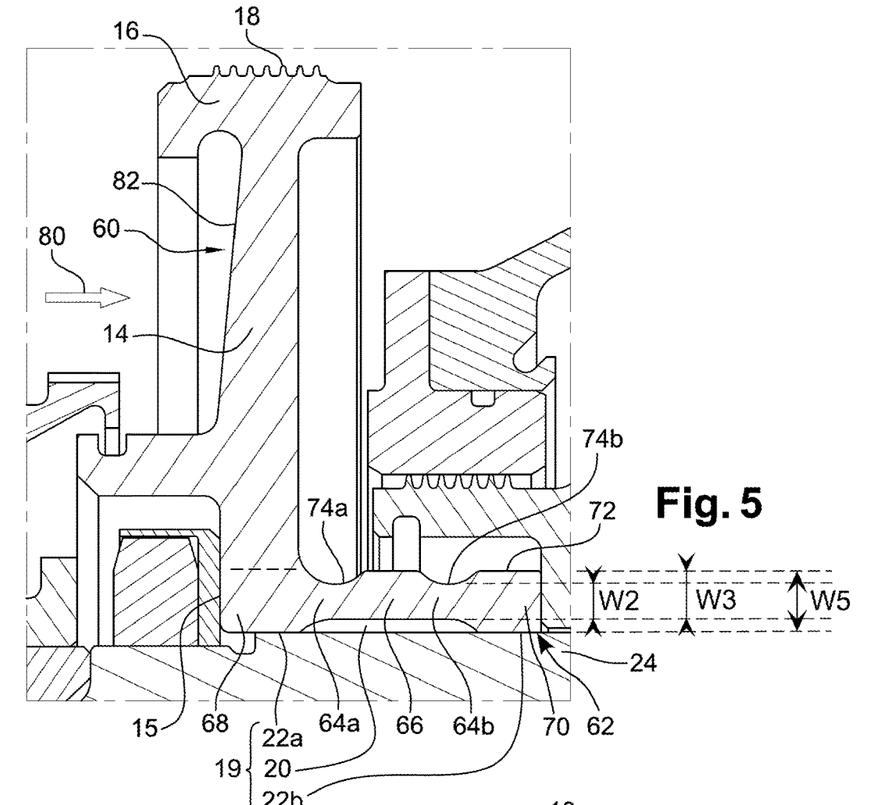
FIG. 5 is a greater scale view of a part of FIG. 4, illustrating the part of revolution and the rotor shaft of the test bench of FIG. 4.

FIG. 4 illustrates a part of a test bench 40 according to a preferred embodiment of the invention, this part being sometimes called "test machine" and essentially comprising a turbine 42 to be tested, an air inlet scroll 44, an air outlet scroll 46, a shaft line 47 and an associated support device 48 comprising in particular a set of bearings for supporting the rotor and stator of the turbine 42, as well as measuring means 50. The shaft line includes in particular a rotor shaft 24 (FIG. 5). In FIG. 4, the arrows 52 illustrate the air path within the test machine in use.

The support device 48 includes in particular a balance piston formed by a part of revolution 60 (FIG. 5) according to one preferred embodiment of the invention. The part of revolution 60 is overall similar to the part of revolution 10 of the known type of FIGS. 1 and 2, but it is mainly distinguished from it because the hub 62 includes five annular regions axially succeeding one another from the axial end 15 of the hub 62, that is, in order (from left to right in FIG. 5): a first annular region 68 extending from the body 14, a second annular region 64a, a third annular region 66, a fourth annular region 64b, and a fifth annular region 70, such that the second annular region 64a and the fourth annular region 64b have respective thicknesses W2 lower than a thickness W3 of the third annular region 66 and a thickness W5 of the fifth annular region 70.

Generally, the hub 62 is snugly fitted to the rotor shaft 24, preferably by shrinking. To that end, the hub has, in a known manner per se, a radially inner face 19 including an annular groove 20 and two cylindrical bearing seats 22a, 22b separated from each other by the annular groove 20 and snugly fitted to the rotor shaft 24. A first 22a of the cylindrical bearing seats axially extends at the first annular region 68, whereas the second cylindrical bearing seat 22b axially extends at the fifth annular region 70.

In the preferred embodiment of the invention, the annular groove 20 extends facing to the third annular region and facing to the second and fourth annular regions 64a, 64b. The thickness W3 of the third annular region 66 is thus higher than the thickness W2 of the second and fourth annular regions 64a, 64b while being lower than the thickness W5 of the fifth annular region 70.

Besides, in the example illustrated, the fifth annular region 70 forms a free end of the hub 62 located on the opposite side of the body 14.

In addition, the hub 62 has a radially outer face 72 including two annular throats 74a, 74b which respectively delimit the second and fourth annular regions 64a, 64b. The annular throats 74a, 74b have preferably a portion of circle cross-section, but can alternatively have other types of cross-section, for example a V cross-section.

Figure 6:
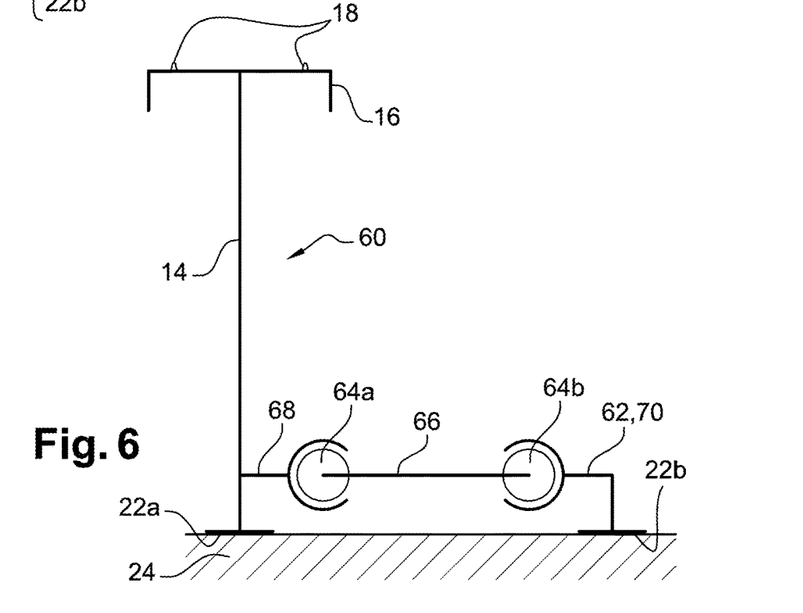
FIG. 6 is a block diagram illustrating the mechanical behaviour of the part of revolution of FIG. 5.

Generally, the second and fourth annular regions 64a, 64b form favoured deformation zones when the part of revolution 60 is subjected to a centrifugal force. In particular, as illustrated in the scheme of FIG. 6, the behaviour of the second and fourth annular regions 64a, 64b can be assimilated to that of a double pivot, when a half-view in axial section of the part of revolution 60 is considered.

The shape of the hub 62 thus enables independence of the mechanical behaviour of the second cylindrical bearing seat 22b to be favoured relative to the first cylindrical bearing seat 22a, with respect to deformations of the part of revolution 60 when the latter is subjected to a centrifugal force. In other words, the deformations of the fifth annular region 70 thus are at least partially decorrelated from the the deformations of the body 14 and of the first annular region 68.

The shape of the hub 62 thus enables an acceptable clamping level to be preserved, at rotation speeds higher than the speeds permitted by the part of revolutions of prior art.

Figure 7:
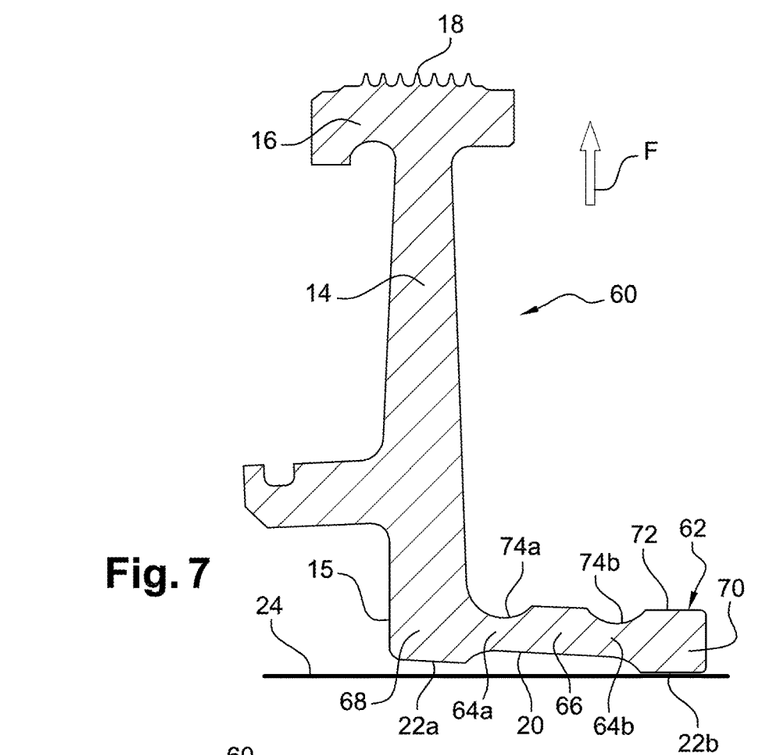
FIG. 7 is a schematic half-view in axial section of the part of revolution of FIG. 5, deformed by centrifugal effect.
Figure 7A:
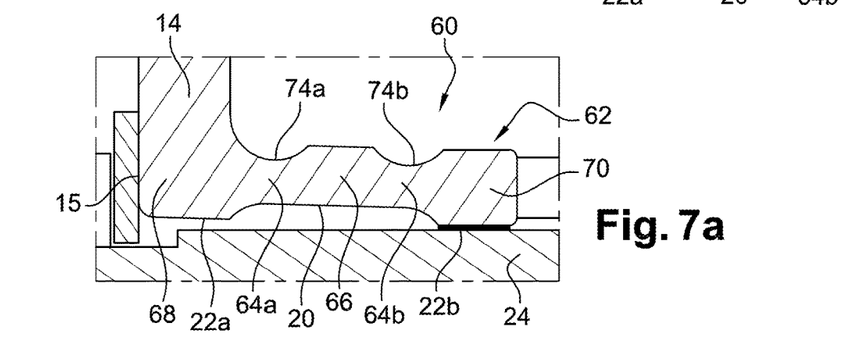
FIG. 7a is a greater scale view of part of FIG. 7, illustrating the hub of the part of revolution of FIG. 5.

FIG. 7 illustrates the part of revolution 60 rotating at a speed of 20,000 revolutions per minute, and shows that the second cylindrical bearing seat 22b (and thus the fifth annular region 70) is always clamped to the rotor shaft 24 at this speed (see also FIG. 7a), in spite of the deformations of the body 14 which are induced by the centrifugal force F.

Figure 8:
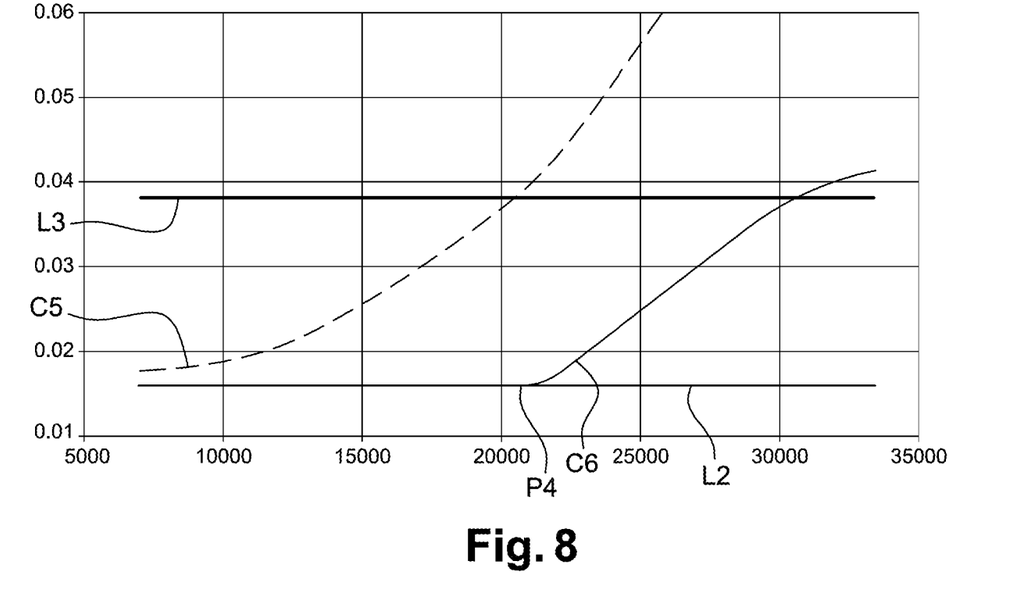
FIG. 8 is a graph illustrating the change over time of the clearance between the hub of the part of revolution and the rotor shaft of the bench of FIG. 4, as a function of the rotation speed of the rotor shaft.

More precisely, FIG. 8 is a graph having in abscissa the rotation speed of the rotor shaft 24 in revolutions per minute, and in ordinate, the clearance relative to the rotor shaft 24 in millimetres. This graph includes:
 a fifth curve C5 relating to a first axial end 34a (FIG. 7a) of the contact zone 36 between the second cylindrical bearing seat 22b and the rotor shaft 24, the first axial end 34a being located on the side of the first cylindrical bearing seat 22a,
 a sixth curve C6 relating to a second axial end 34b (FIG. 7a) of the contact zone 36 between the second cylindrical bearing seat 22b and the rotor shaft 24, the second axial end 34b being located on the opposite side of the first cylindrical bearing seat 22a.

In this graph, the horizontal line L2 having in ordinate 0.016 mm symbolises the maximum clearance beyond which clamping (or shrinking) is considered as lost for the zone concerned.

Thus, point P4 corresponds to the clamping loss of the second axial end 34b, and thus of the part of revolution 60.

Figure 7B:
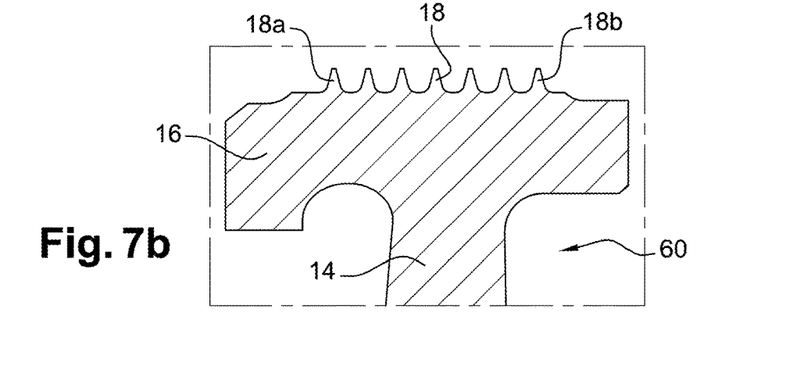
FIG. 7b is a greater scale view of another part of FIG. 7, illustrating a head of the part of revolution of FIG. 5.

As also appears in FIG. 7, the head 16 of the part of revolution 60 substantially preserves the same rotation orientation at 20000 revolutions per minute than when the part of revolution 60 is stationary (see also FIG. 7b). The deformation of the part of revolution 60 actually induces a movement of the head 16 which, when viewed in an axial section, is substantially similar to a translation.

Figure 9:
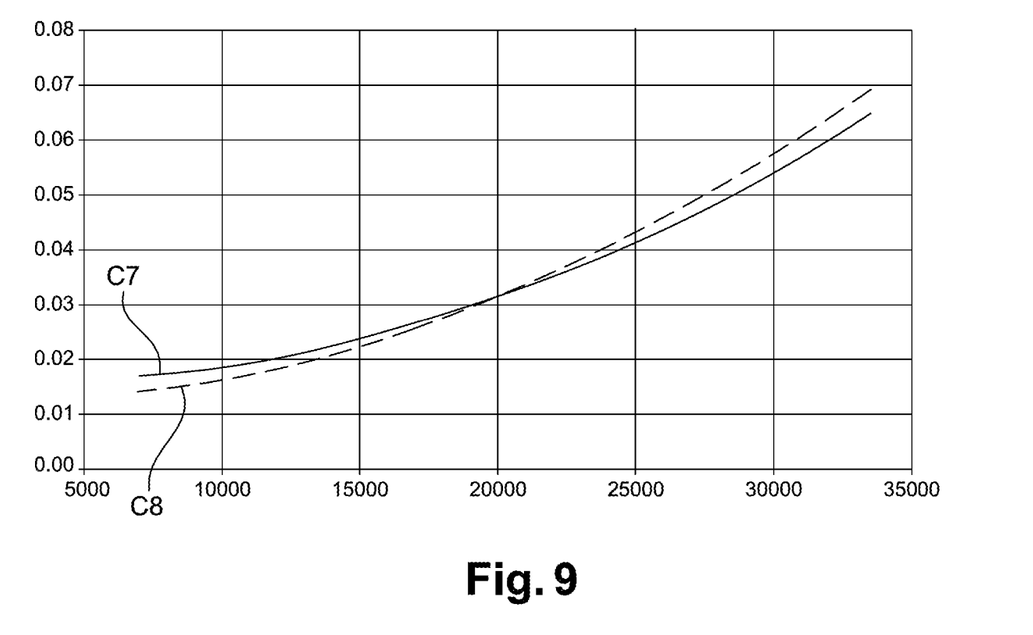
FIG. 9 is a graph illustrating the deformation of the head of the part of revolution of the bench of FIG. 4, as a function of the rotation speed of the rotor shaft.

This advantage is also deduced from FIG. 9 which is a graph having in abscissa the rotation speed of the rotor shaft 24 in revolutions per minute, and in ordinate the movement of the sealing lips 18 of the head 16. This graph includes:
 a seventh curve C7 relating to a first end sealing lip 18a (FIG. 7b) located on the opposite axial side of the hub 62,
 an eighth curve C8 relating to a second end sealing lip 18b (FIG. 7b) located on the same axial side as the hub 62.

This graph shows that the respective movements of both these end sealing lips 18a, 18b remain very close to each other in the entire operating range of the test bench, in particular around 20,000 revolutions per minute.

The invention also relates to a method for testing a turbine 42, such as a turbine for an aircraft turbomachine, comprising at least steps of mounting the turbine 42 into a test bench 40 of the type described above, in particular connecting a rotor of the turbine to the rotor shaft 24 of the test bench, and then rotating the turbine rotor, and thus causing rotating of the balance piston formed by the part of revolution 60, while applying a pressurised gas 80 (FIG. 5) on a side 82 of the body 14 of the balance piston opposite to the turbine 42 such that the balance piston applies an axial load to the turbine.

In this method, the body 14 of the balance piston 60 deviates radially outwardly under the effect of the centrifugal force F (FIG. 7) induced by the rotation of the balance piston, while the second and fourth annular regions 64a, 64b of the hub 62 are deformed as a double pivot, enabling the deformation of the fifth annular region 70 to be limited in relation to the deformation of the body 14, as explained above.

What is claimed is:
1. A part of revolution for a turbine test bench or for a turbomachine, for being rotated, and comprising a hub for being fitted to a rotatable shaft, and a body extending radially outwardly from an axial end of the hub,
 wherein the hub includes five annular regions axially succeeding one another from the axial end of the hub, that is, in order, a first annular region extending from the body, a second annular region, a third annular region, a fourth annular region, and a fifth annular region, the second annular region and the fourth annular region having a thickness lower than a thickness of the third and fifth annular regions, such that when the part of revolution is subjected to a centrifugal force, the second annular region and the fourth annular region form favoured deformation zones behaving as a double pivot.

2. The part of revolution according to claim 1, further including a head formed at a radially outer end of the body of the part of revolution and having first sealing means being part of a rotatable seal.

3. The part of revolution according to claim 1, wherein the hub has a radially inner face including an annular groove, and two cylindrical bearing seats separated from each other by the annular groove and extending facing the first and fifth annular regions respectively.

4. The part of revolution according to claim 3, wherein the annular groove extends facing the second, third and fourth annular regions.

5. The part of revolution according to claim 1, wherein the hub has a radially outer face including two annular throats which delimit the second and fourth annular regions respectively.

6. A test bench for a turbine, comprising:
   a rotor shaft for supporting a rotor of a turbine to be tested, and
   a part of revolution comprising a hub for being fitted to said rotor shaft and a body extending radially outward from an axial end of the hub,
   wherein the hub includes five annular regions axially succeeding one another from the axial end of the hub, that is, in order, a first annular region extending from the body, a second annular region, a third annular region, a fourth annular region, and a fifth annular region,
   the second annular region and the fourth annular region having a thickness lower than a thickness of the third and fifth annular regions, such that when the part of revolution is subjected to a centrifugal force, the second annular region and the fourth annular region form favoured deformation zones behaving as a double pivot, and
   wherein the part of revolution is subjected to the pressure of a pressurised fluid to apply an axial load to the turbine to be tested.

7. The test bench according to claim 6, wherein the hub has a radially inner face including an annular groove, and two cylindrical bearing seats separated from each other by the annular groove and extending facing the first and fifth annular regions respectively, the test bench further comprising an annular element relative to which the part of revolution is rotatably movable, said annular element having second sealing means cooperating with said first sealing means to form a rotatable seal.

8. A method for testing a turbine, comprising at least steps of:
   mounting the turbine into a test bench the test bench comprising:
      a rotor shaft for supporting a rotor of the turbine to be tested, and
      a part of revolution comprising a hub for being fitted to said rotor shaft and a body extending radially outward from an axial end of the hub,
      wherein the hub includes five annular regions axially succeeding one another from the axial end of the hub, that is, in order, a first annular region extending from the body, a second annular region, a third annular region, a fourth annular region, and a fifth annular region,
      the second annular region and the fourth annular region having a thickness lower than a thickness of the third and fifth annular regions, such that when the part of revolution is subjected to a centrifugal force, the second annular region and the fourth annular region form favoured deformation zones behaving as a double pivot, and then
   rotating the rotor of the turbine, and causing rotating of the part of revolution, while applying a pressurised gas to a side of the body of the part of revolution facing the turbine such that the part of revolution applies an axial load to the turbine,
   wherein the body of the part of revolution deviates radially outwardly under the effect of a centrifugal force induced by the rotation of the part of revolution, while the second and fourth annular regions of the hub of the part of revolution are deformed as a double pivot.

\* \* \* \* \*